US011451549B2

(12) United States Patent
Taft et al.

(10) Patent No.: US 11,451,549 B2
(45) Date of Patent: Sep. 20, 2022

(54) AUTHORIZATION FOR NETWORK FUNCTION REGISTRATION (71) Applicant: Verizon Patent and Licensing Inc., Arlington, VA (US)

(72) Inventors: David Taft, Keller, TX (US); Maqbool Chauhan, Keller, TX (US); Jerry Steben, Fort Worth, TX (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 16/689,853

(22) Filed: Nov. 20, 2019

(65) Prior Publication Data
US 2021/0152554 A1  May 20, 2021

(51) Int. Cl.
*H04L 9/40* (2022.01)
*H04L 41/0806* (2022.01)
*G06F 9/455* (2018.01)
*G06F 9/50* (2006.01)

(52) U.S. Cl.
CPC .......... *H04L 63/10* (2013.01); *G06F 9/45558* (2013.01); *G06F 9/5027* (2013.01); *H04L 41/0806* (2013.01); *H04L 63/08* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,701,139 B2* | 6/2020 | Li | H04L 67/1008 |
| 2019/0251241 A1* | 8/2019 | Bykampadi | G06F 21/335 |
| 2020/0228605 A1* | 7/2020 | Dodd-Noble | H04L 67/14 |
| 2021/0105196 A1* | 4/2021 | Dao | H04L 12/189 |
| 2021/0144517 A1* | 5/2021 | Guim Bernat | H04L 47/781 |

* cited by examiner

*Primary Examiner* — Frantz B Jean (57) ABSTRACT

A method for performing authorization for network function registration. The method includes instantiating a network function (NF) based on at least one micro-service; providing a software module with each of the at least one micro-service; sending, from each software module, an authorization code to a NF authorization platform, where the authorization code is associated with the micro-service; forwarding the at least one authorization code received at the NF authorization platform to an NF registration function (NRF); sending, from the NF, a service registration request to the NRF, where the service registration request includes each authorization code associated with the at least one micro-service; and registering the NF with the NRF, where the NRF validates each authorization code received from the NF.

20 Claims, 7 Drawing Sheets

AUTHORIZATION FOR NETWORK FUNCTION REGISTRATION

BACKGROUND

Service providers are deploying wireless networks utilizing configurable cloud-based wide area network (WAN) services. A wireless networking environment may be complex and include network functions (NFs) for performing a variety of communications tasks. Deployment and management of the NFs may be simplified using a container orchestration platform (COP). However, existing wireless standards have not defined how NFs may be authorized to register for operation within a wireless communication system. Conventional approaches may only permit specific routing to registration entities, such as, for example, a network function registration function (NRF), based on internet protocol (IP) practices. However, such approaches may not be dynamic enough in a web-scale environment to prevent a "rogue" NF from registering to the NRF.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A wireless service provider may be responsible for maintaining network infrastructure, such as a networking core (e.g., Fifth Generation (5G) core), which may be implemented using various NFs. The NFs may be implemented as software applications defined herein as containers. Containers may be similar to virtual machines (VMs), but can have relaxed isolation properties to share the operating system (OS) among the applications Similar to a VM, a container may have its own filesystem, central processing unit, memory, process space, etc. For example, a Docker container image is a lightweight, standalone, executable package of software that includes everything needed to run an application: code, runtime, system tools, system libraries and settings. Since containers are decoupled from the underlying infrastructure, containers are portable across clouds and OS distributions. To facilitate the creation and maintenance of containers, a container orchestration platform (COP) may be used to automate NF deployment, scaling, and/or management. The COP may organize containers into groups called pods to ease the creation of NFs. Existing COPs may include Kubernetes (k8s), Amazon web services (AWS), Nomad, Cloudify, IronWorker, Docker, Apache Mesos, Openshift Container Platform, etc. Embodiments described herein are directed to wireless communications systems where the COP directs the authorization of NFs for registration with a NF registration function (NRF).

Figure 1:
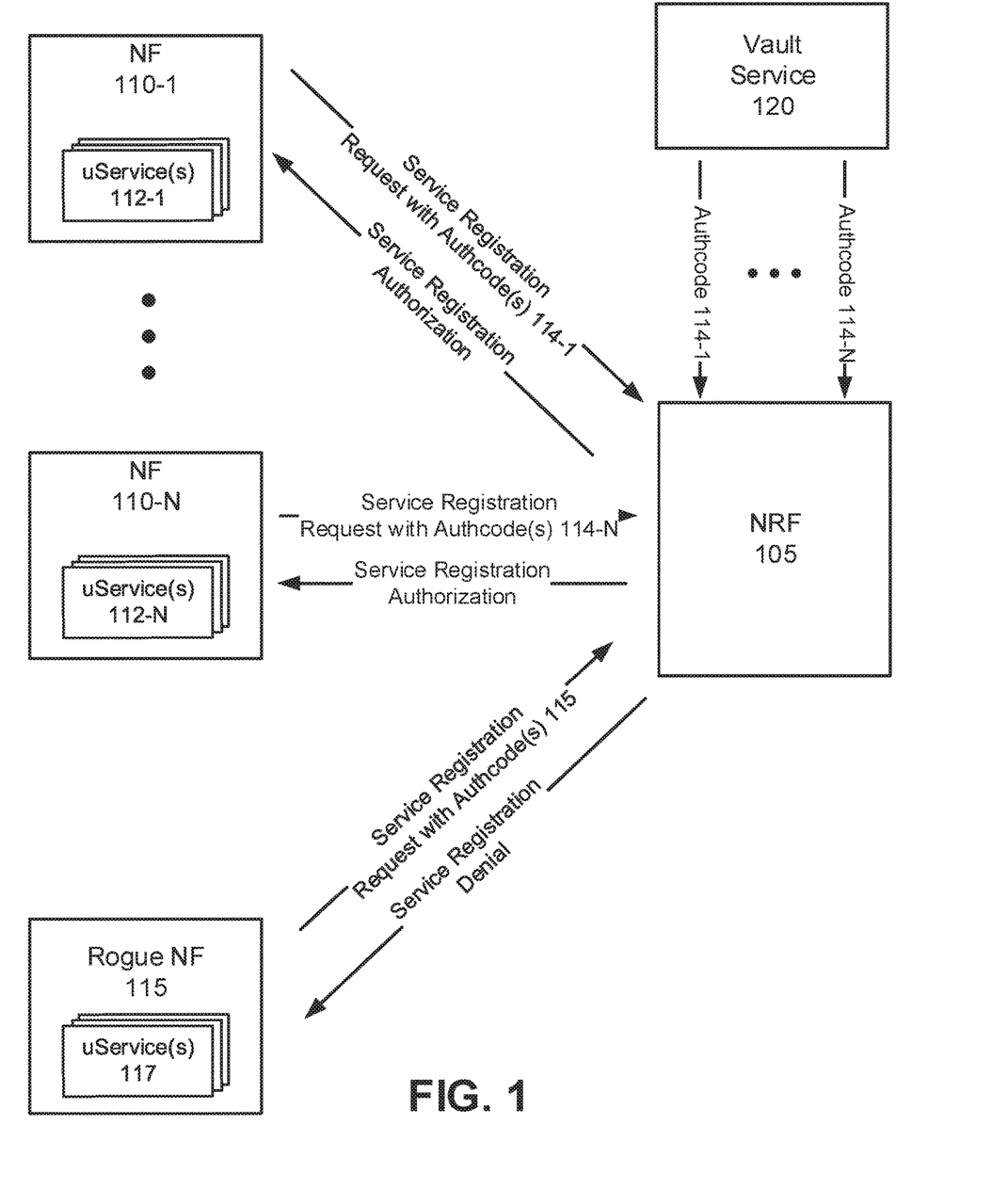
FIG. 1 is a diagram illustrating a top-level signal flow of authorizing NFs for registration with an NRF within a networking core.
Figure 3:
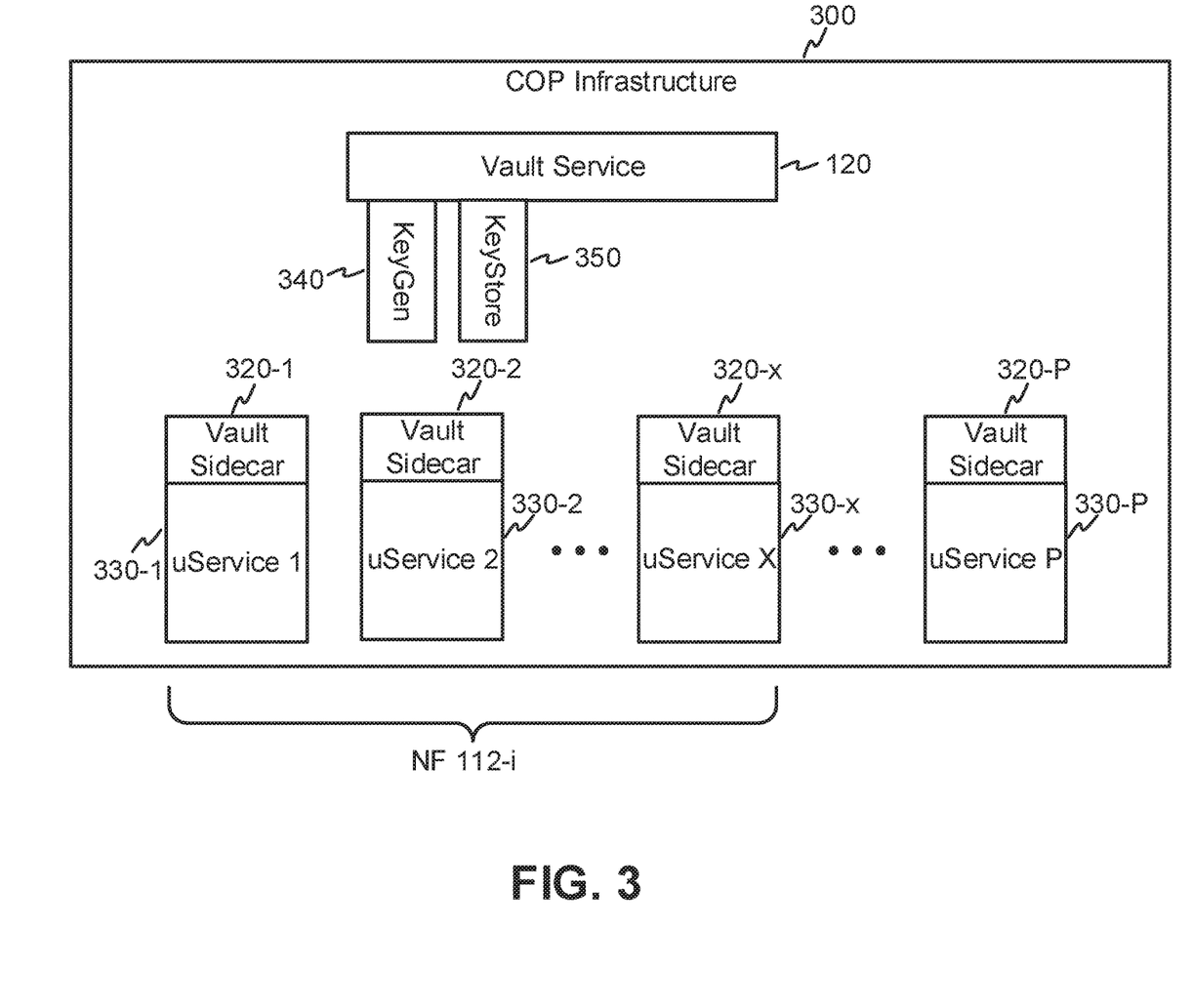
FIG. 3 is a block diagram of an exemplary COP infrastructure consistent with an embodiment.

FIG. 1 is a diagram illustrating a top-level signal flow of authorizing NFs for registration with an NRF within a networking core. Networking core may include an NRF 105, NFs 110-1 through 110-N (referred to herein generically as NFs 110), a rogue NF 115, and a vault service 120, wherein the vault services is associated with the NF authorization platform. NFs 110 and rogue NF 115 may communicate with NRF 105 over standard interfaces (as illustrated in FIG. 3) within the networking core, and vault service 120 may communicate with NRF 105 over a standard packet network. The interfaces may include wired, optical, and/or wireless links. A communication connection via a link may be direct or indirect. For example, an indirect communication connection may involve an intermediary device and/or an intermediary network not illustrated in FIG. 1. According to other embodiments, environment 100 may include additional networks, fewer networks, and/or different types of networks than those illustrated and described herein.

NFs 110 are authorized networking functions established under the authorization of the service provider. NFs 110 may be based on one or more approved micro-service(s) (uService(s)) 112-1 through 112-N (referred to generically as uService(s) 112). NFs 110 provide desired functionality for the networking core through uService 112. Rogue NF 115 is a network function that is not authorized by the service provider, and is based on one or more uService(s) 117 that may not be authorized by the service provider.

As part of a pre-registration process described in detail below with refence to FIGS. 5A-6, vault service 120 may be provisioned with authorization codes (hereinafter "authcodes") corresponding to uServices 112 which are used by NFs 110-1 through 110-N. Each authcode may correspond to a uService 112, and in an embodiment, can be used to identify a particular uService 112. In various embodiments, an authcode may be any type of identification, such as, for example, a universally unique identifier (UUID), or a globally unique identifier (GUID). Additionally or alternatively, authcodes may include any type of metadata regarding a NF 110 and/or a uService 112, metadata regarding vault service 120, etc. Authcodes may include conditional and/or temporal information pertaining to the authorization of a particular uService 112 (e.g., a time duration setting the expiration of an authorization), location information for authorization, etc.

Further referring to FIG. 1, during the pre-registration process, vault service 120 may be provisioned with authcodes 114-1 through 114-N via the COP. The pre-registration process further includes vault service 120 forwarding authcodes 114-1 through 112-N to NRF 105. Once NRF 105 is provisioned with authcodes 114-1 through 114-N, the registration of NFs 110-1 through 110-N with NRF 105 may commence. For example, NF 110-1, having corresponding uService(s) 112-1, may send a service registration request to NRF 105. The service registration request may include one or more authcode(s) 112-1. Upon receiving authcode(s) 112-1, the NRF 105 may search for a match with the authcodes 114-1 through 114-N received from vault service 120. As authcode 114-1 was received from vault service 120 as shown in FIG. 1, NRF 105 will authorize the service registration of NF 110-1. Upon the authorization, NRF 105 will send a service authorization message back to NF 110-1. NF 110-2 through NF 110-N may be authorized in a similar manner, as the corresponding authcodes 114-2 through 114-N are present in NRF 105.

However, when rouge NF 115 attempts to register to NRF 105 by sending a service authorization request with authcode(s) 115, NRF 105 will deny the service registration of rouge NRF 115 because authcode(s) 115 cannot be matched with authcode(s) 114-1 through 114-N by NRF 105. As a result, in response to the service registration request from rouge NF 115, NRF 105 will send a message indicating a service registration denial to rouge NF 115.

Figure 2:
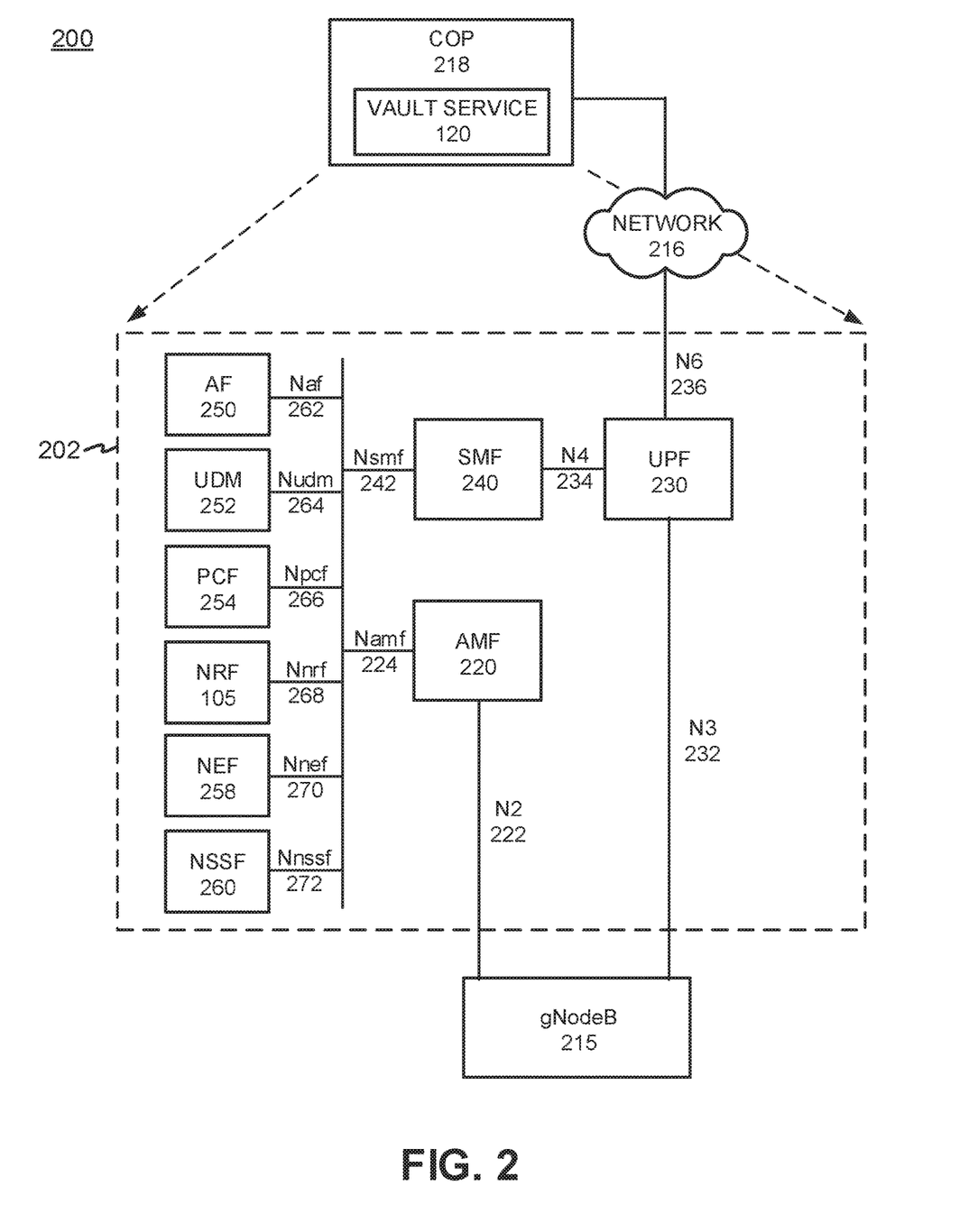
FIG. 2 is a block diagram of an exemplary provider network based on a 5G standard.

FIG. 2 is a block diagram of an exemplary provider network 200 based on a 5G standard. As shown in FIG. 2, provider network 200 may include 5G core 202, gNodeB 215, network 216, and COP 218. A UE (not shown) may wirelessly connect with gNodeB 215 to exchange data over a radio access technology (RAT) based on 5G air channel interface protocols. Network 216 may further include an Internet Protocol (IP) network and/or a non-IP network, which may be embodied separately or included in a WAN and/or backhaul network (not shown). COP 218, which include vault service 120, may interface via network 216 to one or more computing resources (e.g., nodes) which host the network functions (NFs) comprising 5G core 202. Moreover, COP 218 may instantiate, deploy, scale, and manage the NFs in 5G core 202 which are described in detail below.

5G core 202 may include the following NFs: an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 105, a Network Exposure Function (NEF) 258, and a Network Slice Selection Function (NSSF) 260. While FIG. 2 depicts a single gNodeB 215, AMF 220, UPF 230, SMF 240, AF 250, UDM 252, PCF 254, NRF 105, NEF 258, and/or NSSF 260 for exemplary illustration purposes, in practice, FIG. 2 may include multiple gNodeBs 215, AMFs 220, UPFs 230, SMFs 240, AFs 250, UDMs 252, PCFs 254, NRFs 105, NEFs 258, and NSSFs 260. Each NF included in 5G core 202 as shown in FIG. 2 may be instantiated, deployed, scaled, and managed by COP 218 via network 216.

GNodeB 215 may include one or more devices (e.g., base stations) and other components and functionality that enable a UE to wirelessly connect to 5G core 202 and/or network 216 using a 5G radio access technology (RAT). For example, gNodeB 215 may include one or more cells, with each cell including a wireless transceiver with an antenna array configured for millimeter-wave wireless communication. GNodeB 215 may implement one or more radio access network (RAN) slices to partition 5G core 202. GNodeB 215 may communicate with AMF 220 using an N2 interface 222 and communicate with UPF 230 using an N3 interface 232.

COP 218 may include, create and maintain containers for NF 110 deployment, scaling, and/or management. COP 218 may organize containers into groups called pods to ease the creation of NFs. The pods may include uService(s) 112 for executing the functionality of a particular NF 112 shown in FIG. 2 (e.g., AF 250, PCF 254, NEF 258, NRF 105, etc.) Moreover, COP 218 may execute vault service 120 which may receive authcodes 114 from uService(s) 112, encrypt authcodes 114, and store keys associated with the encrypted authcodes 114. COP 218 may be implemented with Kubernetes (k8s), however, other embodiments may use other container orchestration systems. COP 218 may organize containers into groups called pods, wherein each pod may be associated with a uService 112. COP 218 may run on a computing resource called a master, where pods may run on computing resources called nodes.

AMF 220 may perform registration management, connection management, reachability management, mobility management, lawful intercepts, Short Message Service (SMS) transport between a UE and an SMS function (not shown in FIG. 2), session management messages transport between a UE and SMF 240, access authentication and authorization, location services management, functionality to support non-3GPP provider network, and/or other types of management processes. In some implementations, AMF 220 may implement some or all of the functionality of managing RAN slices in gNodeB 215. AMF 220 may be accessible by other function nodes via a Namf interface 224.

UPF 230 may maintain an anchor point for intra/inter-RAT mobility, maintain an external Packet Data Unit (PDU) point of interconnect to a data network (e.g., network 216), perform packet routing and forwarding, perform the user plane part of policy rule enforcement, perform packet inspection, perform lawful intercept, perform traffic usage reporting, enforce quality of service (QoS) policies in the user plane, perform uplink traffic verification, perform transport level packet marking, perform downlink packet buffering, send and forward an "end marker" to a Radio Access Network (RAN) node (e.g., gNodeB 215), and/or perform other types of user plane processes. UPF 230 may communicate with SMF 240 using an N4 interface 234 and connect to network 216 using an N6 interface 236.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via a Naf interface 262.

UDM 252 may maintain subscription information for a UE, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, execute policy decisions, and/or perform other types of processes associated with policy enforcement. PCF 254 may be accessible via Npcf interface 266. PCF 254 may specify QoS policies based on QoS flow identity (QFI) consistent with 5G network standards.

NRF 105 may support a service discovery function and maintain a profile of available NF instances and their supported services. An NF profile may include an authcode 114, (where an authcode may include a UUID, a GUSD, an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 105 may be accessible via an Nnrf interface 268.

NEF 258 may expose capabilities, events, and/or status to other NFs, including third party NFs, AFs, edge computing NFs, and/or other types of NFs. For example, NEF 258 may provide capabilities and events/status of a UE to network 216. Furthermore, NEF 258 may secure provisioning of information from external applications to network 216, translate information between network 216 and devices/networks external to network 216, support a Packet Flow Description (PFD) function, and/or perform other types of network exposure functions. NEF 258 may be accessible via Nnef interface 270.

NSSF 260 may select a set of network slice instances to serve a particular UE, determine network slice selection assistance information (NSSAI), determine a particular AMF 220 to serve a particular UE, and/or perform other types of processes associated with network slice selection or management. In some implementations, NSSF 260 may implement some or all of the functionality of managing RAN slices in gNodeB 215. NSSF 360 may be accessible via Nnssf interface 272.

Although FIG. 2 shows exemplary components of provider network 200, in other implementations, provider network 200 may include fewer components, different components, differently arranged components, or additional components than depicted in FIG. 2. Additionally or alternatively, one or more components of provider network 200 may perform functions described as being performed by one or more other components of provider network 200. For example, provider network 200 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, provider network 130 may include a reference point architecture that includes point-to-point interfaces between particular function nodes.

FIG. 3 is a block diagram of an exemplary COP infrastructure 300 consistent with an embodiment. COP infrastructure 300 may be implemented by COP 218 (e.g., Kubernetes platform) and vault service 120 executed on an associated computing platform (e.g., a master). COP infrastructure 330 may further include a plurality of pods 330-1 through 330-P which may execute on at least one separate computing platform(s) (e.g., node(s), wherein at least one pod 330 may run on a single node). Each pod 330-i may be associated with a uService i (where i=1, . . . , P). One or more uServices may be included in each NF 110. Specifically, one or more uService(s) 1, . . . , X shown in pods 330-1 through 330-X may be combined into a particular group of uService(s) 112-i associated with a particular NF 110-i. Each pod 330-i may be linked with a vault sidecar 320-i. The term sidecar refers to a utility container in a pod 330-i which adds functionality to support the pod 330-i. For example, each sidecar 320-i may be a software module or a set of uServices that provide a specific functionality which may directed towards peripheral tasks which support pod 330. Accordingly, a side car may be a support software module. In an embodiment (e.g., an upstream Kubernetes model), because the service provider may administer COP infrastructure 300, the service provider may "inject" or forward vault sidecars 320 into each of pods 330 to support authorization of NF 110 by NRF 105. For example, the service provider may store sidecars 320 with each uService 330 to support the uService.

COP infrastructure 300 may provide vault service 120 at the platform layer to perform a pre-registration process. During the pre-registration process, sidecars 320 may be injected into pods 330 to support the pre-registration. In an embodiment, vault service 120 may perform this injection process. Vault sidecars 320 may collect an authcode 114 (e.g., a UUID) associated with each uService 330, and send the collected authcodes 114 to vault service 120 to pre-register that particular authcode 114. In an embodiment, vault service 120 may encrypt the authcodes 114 and corresponding uService. The authcodes 114 may be encrypted with any suitable encryption algorithm, such as a one-way encryption algorithm (e.g., a hashing function) and/or a two-way encryption algorithm (e.g., pretty good privacy (PGP) encryption algorithm). In an embodiment, a key generator (KeyGen 340) and a key storage (KeyStore 350) may be used to generate and store encryption keys associated with encrypted authcodes 114 (e.g., UUIDs), respectively. Once the keys are pre-registered (and optionally encrypted), vault service 120 may provide authcodes 114 to NRF 105 prior to the registration of NFs 110-1 through 110-N as discussed above in reference to FIG. 1. Details of the pre-registration process are discussed below in relation to FIGS. 5A through 6.

Figure 4:
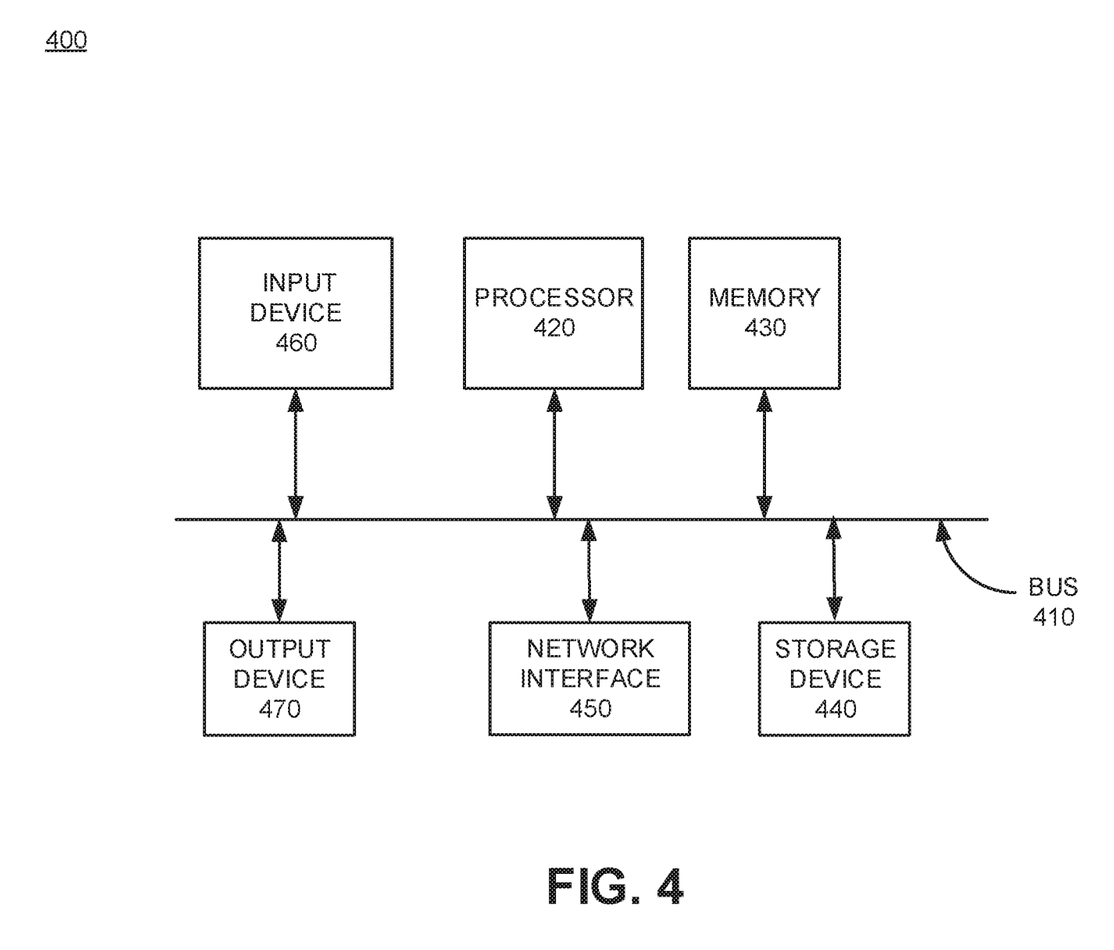
FIG. 4 is a block diagram showing exemplary components of a network device according to an embodiment.

FIG. 4 is a block diagram showing exemplary components of a network device 400 according to an embodiment. COP 218 may execute on a distinct network device 400 implemented as a master computing resource (hereinafter "master"). One or more pods 330 may be executed on additional network devices 400 implemented as node computer resources (hereinafter "nodes"). In some embodiments, a plurality of network devices 400 provide functionality as masters and/or nodes. Alternatively, one network device 400 may perform the functionality of a master, and a separate network device may perform the functionality of all of the nodes in COP infrastructure 300. Network device 400 may include a bus 410, a processors 420, a memory 430, storage device 440, a network interface 450, input device 460, and an output device 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities that are communicatively coupled to network 216.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays.

Network interface 450 may include a transceiver that enables network device 400 to communicate with other devices and/or systems in network environment 100. Network interface 450 may be configured to exchange data with network 216 over wired communications (e.g., conductive wire, twisted pair cable, coaxial cable, transmission line, fiber optic cable, and/or waveguide, etc.), or a combination of wireless. In other embodiments, network interface 450 may interface with network 216 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, one or more network devices 400 may perform certain operations supporting COP infrastructure 300. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the signal flows in FIGS. 5A and 5B, and the flow chart shown in FIG. 6.

Although FIG. 4 shows exemplary components of network device 400, in other implementations, network device 400 may include fewer components, different components, additional components, or differently arranged components than depicted in FIG. 4.

Figure 5A:
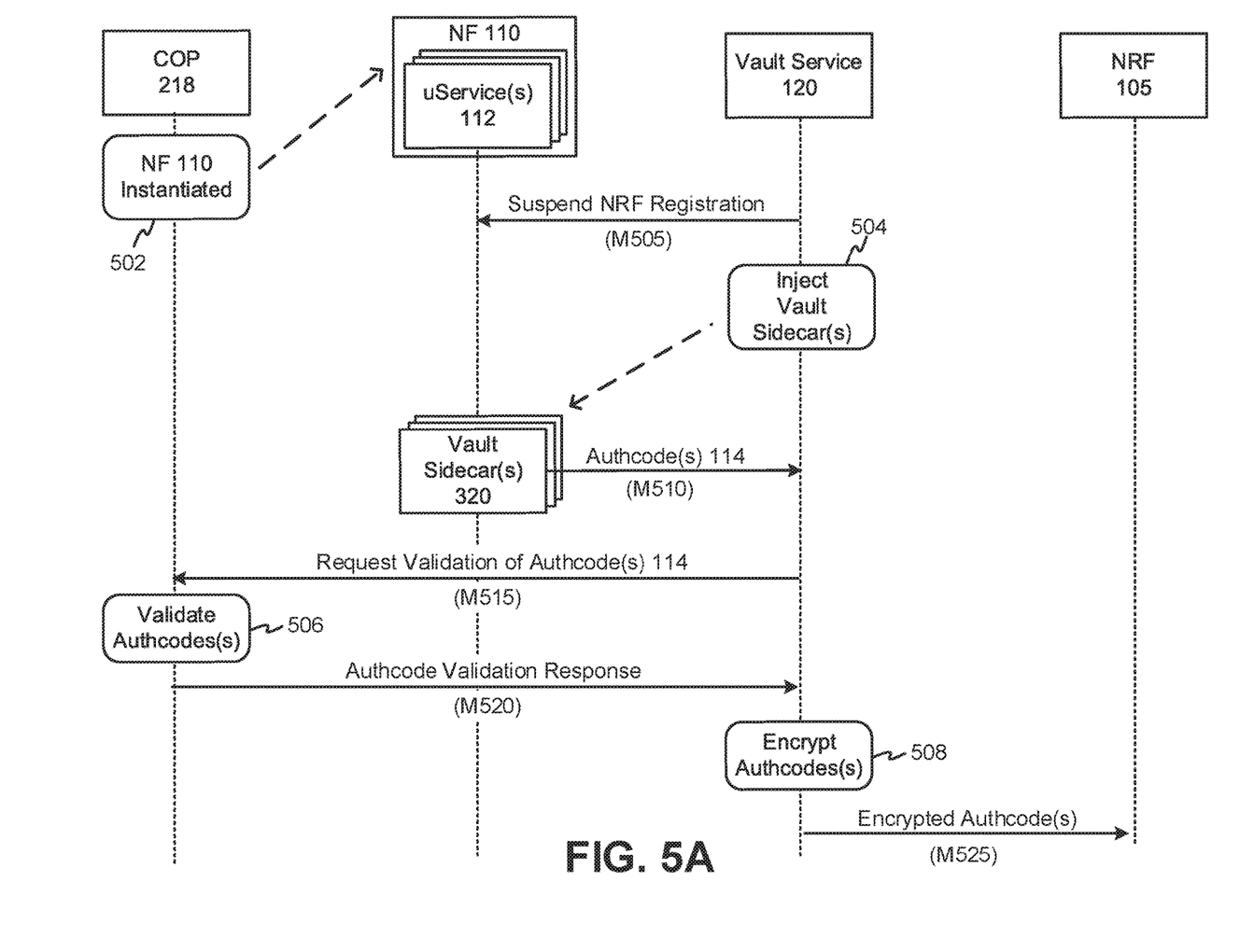
FIGS. 5A-5B are diagrams showing exemplary message flows for authorizing service registrations of network functions.
Figure 5B:
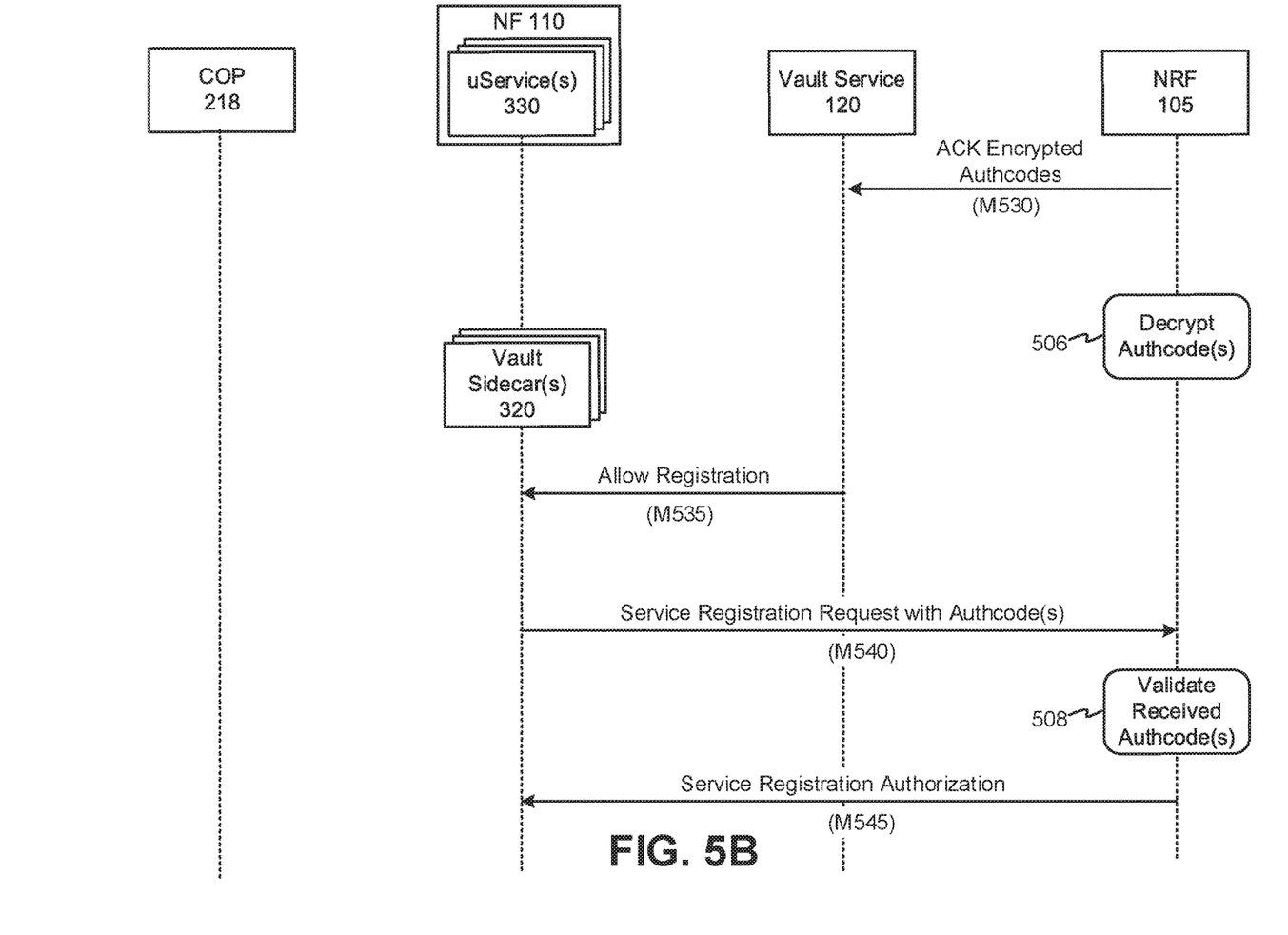

FIGS. 5A-5B are diagrams showing exemplary message flows for authorizing service registrations of NFs 110. Initially, COP 218 may instantiate an NF 110 within the infrastructure of a wireless network (e.g., within 5G core 202) (Block 502).

The instantiation of NF 110 will start up appropriate uServices(s) 112 for NF 110. Vault service 120 may the send a message to NF 110 to suspend registration with NRF 105 so that a pre-registration may be performed (M505). Vault service 120 may then inject vault sidecar(s) 320 into pods 330 associated with the appropriate uServices 112 for NF 110 (Block 504). Vault sidecar(s) 320 may determine the appropriate authcodes 114 (e.g., UUIDs) associated with uService(s) 112, and send the authcodes 114 to vault service 120 (M510). In an embodiment, vault service 120 may send a request to COP 218 to validate authcode(s) 114 received from vault sidecar(s) 320 (M515). COP 218 may validate authcode(s) 114 (Block 506), and then send a message indicating the validity of authcode(s) 114 (M520). In an embodiment, vault service 120 may encrypt authcode(s) 114 using one way or two-way encryption (Block 508). Vault service 120 may send the encrypted authcode(s) 114 to NRF 105 (M525).

As shown in FIG. 5B, NRF 105 may send a message to vault service 120 acknowledging the received encrypted authcode(s) (M530). NRF 105 may then decrypt the authcodes received in message M530 (Block 506). Vault service 120 may then send a message to NF 110 indicating pre-registration is complete, and NF 110 may perform registration with NRF 105 (M535). NF 110 may then send a service registration request with authcode(s) 114 (M540). NRF 105 may validate the authcode(s) 114 received in message M540 with the authcode(s) 114 provided by vault service 120 prior to registration (Block 508). Once the authcode(s) 114 received in the service registration request message M540 have been validated in Block 508, NRF 105 may send a service registration authorization message to NF 110 (M545).

Figure 6:
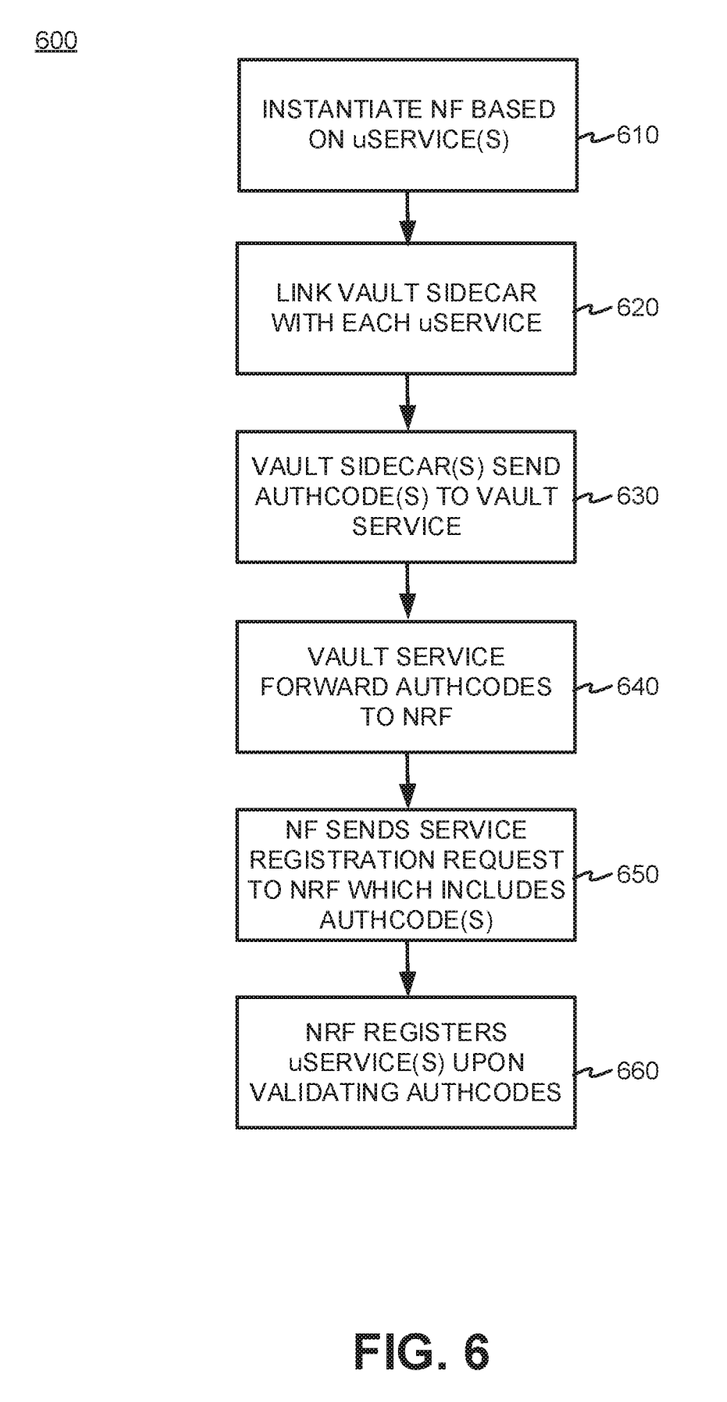
FIG. 6 is a flow chart showing an exemplary process for authorizing service registrations of network functions.

FIG. 6 is a flow chart showing an exemplary process 600 for authorizing NF 110 registration with an NRF 105. Process 600 may be performed by plurality of network devices 400, each having at least one processor 420 executing instructions stored in memory 430 and/or stored in storage device 440. Network devices 400 may be implemented in one or more devices in 5G networks. Network device 400 may be embodied as a single device performing multiple network functions, or as separate network devices each performing specific network functions.

In this example, COP infrastructure 300 includes both hardware and software, where COP 218 (e.g., Kubernetes) may execute on at least one computing resource called a master which may be embodied as at least one network device 400. COP infrastructure 300 may also include pods 330 which may execute on a plurality of computing resources called nodes, where each node may be embodied as at least one network device 400. Accordingly, a plurality of network devices 400 may contribute to the implementation of process 600. Utilizing COP infrastructure 300, processors 420 may initially instantiate network function (NF) 110 based on one or more uService(s) 112 (Block 610). In an embodiment, the COP 218 may be part of a Kubernetes infrastructure that instantiates NF 110 and the uService(s) 112. NF 110 may be instantiated, for example, based on a Helm chart. UService(s) 112 may be associated with pod(s) 330 within the Kubernetes infrastructure. In an embodiment, vault service 120 may inject a vault sidecar 320 into the pods 330 to support the pre-registration of NFs 110/uServices 112. Processors 420 may send a first command from vault service 120 to NF 110, where the first command instructs NF 110 to suspend registration with NRF 105 prior to NRF 105 receiving each authcode 114 associated with the uService(s) 112.

Processors 420 may link vault sidecar(s) 320 with each of the uService(s) (Block 620). For example, processor(s) 420 executing COP 218 may inject or forward vault sidecar(s) 320 to pods 330. Processors 420 may then send, from each vault sidecar 320, an authorization code (authcode 114) to vault service 120, where the authcode 114 may be associated with uService(s) 112 linked to vault sidecar(s) 320 (Block 630). In an embodiment an authcode 114 may be a universally unique identifier (UUID) identifying a uService 112. In an embodiment, processors 520 may encrypt the authorization code(s) 114 using vault service 120 prior to forwarding the authorization code(s) 114 to NRF 105. Processors 420 may perform a one-way and/or a two-way encryption algorithm on the authcode(s) 114.

Processors 420 may forward authcode(s) 114 received at vault service 120 to NRF 105 (Block 640). In an embodiment, the NRF 105 may send an acknowledgment to vault service 120, where the acknowledgment confirms that vault service 120 received the authcode(s) 114.

NF 110 may send a service registration request to NRF 105, where the service registration request includes each authcode 114 associated with the uService(s) 112 (Block 650). In one implementation, NRF 105 may decrypt authcodes 114 if they were previously encrypted by vault service 120 (e.g., Block 508 in FIG. 5A).

In an embodiment, processors 420 may send a second command from vault service 120 to the NF 110, where the second command instructs NF 110 to allow registration with NRF 105 after NRF 105 receives each authcode 114 associated with the uService(s) 112. NF 110 may then register with NRF 105, where NRF 105 validates each authcode 114 received from NF 110 (Block 660). The validation may be performed by matching the authcode(s) 114 received from vault service 120 during pre-registration with the authcode(s) received in service registration request in Block 650. In this manner, NFs 110 may register with NRFs 105 since NRF 105 is assured that NFS 110 are genuine and not rogue NFs 110.

Moreover, rouge NF 115 may be prevented from pre-registering to prevent unauthorized authentication attempts with NRF 105. Any metadata between NF 110 and vault service 120 may be exchanged, which can include any proprietary metadata that the service provider designates. Additionally, vault service 120 can be configured (either manually or in an automated fashion) to disallow/prevent sidecar injection if the configured metadata does not match what was received from NF 110. For example, the above-noted configuration for vault service 120 can enforce that only a specific NF type, from a specific vendor, should be allowed to have vault sidecar 320 injected.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of signal flows, messages, states, and/or blocks have been described with regard to FIGS. 5A, 5B, and 6, the order of the signal flows, messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   instantiating a network function (NF) based on at least one micro-service;
   injecting a vault sidecar into each of the at least one micro-service, wherein the vault sidecar is transmitted from a vault service associated with an NF authorization platform to the NF;
   sending, from each vault sidecar, an authorization code to the NF authorization platform, wherein the authorization code is associated with the micro-service;
   forwarding the at least one authorization code received at the NF authorization platform to an NF registration function (NRF);
   sending, from the NF, a service registration request to the NRF, wherein the service registration request includes each authorization code associated with the at least one micro-service; and
   registering the NF with the NRF, wherein the NRF validates each authorization code received from the NF.

2. The method of claim 1, wherein an authorization code is a universally unique identifier (UUID) identifying a micro-service.

3. The method of claim 1, further comprising:
   encrypting the at least one authorization code by the NF authorization platform prior to forwarding the at least one authorization code to the NRF.

4. The method of claim 3, wherein encrypting further comprises:
performing a one-way encryption algorithm on the at least one authorization code.

5. The method of claim 1, further comprising:
sending an acknowledgment from the NRF to the NF authorization platform, wherein the acknowledgment confirms that the NF authorization platform received that at least one authorization code.

6. The method of claim 1, further comprising:
sending a first command from the NF authorization platform to the NF, wherein the first command instructs the NF to suspend registration with the NRF prior to the NRF receiving each authorization code associated with the at least one micro-service.

7. The method of claim 6, further comprising:
sending a second command from the NF authorization platform to the NF, wherein the second command instructs the NF to allow registration with the NRF after the NRF receives each authorization code associated with the at least one micro-service.

8. The method of claim 7, wherein the micro-services are associated with a pod within a Kubernetes infrastructure.

9. The method of claim 8, wherein the vault sidecar is transmitted to the pods by the NF authorization platform.

10. A container orchestration platform infrastructure, comprising:
a master computing resource, comprising
a first network interface;
a first memory configured to store a first set of instructions;
at least one first processor coupled to the first network interface and the first memory, wherein the at least one first processor is configured to execute the first set of instructions stored in the first memory to:
instantiate a network function (NF) based on at least one micro-service, and
inject a vault sidecar into each of the at least one micro-service, wherein the vault sidecar is transmitted from a vault service associated with an NF authorization platform to the NF;
a plurality of node computing resources, each node comprising:
a second network interface;
a second memory configured to store a second set of instructions; and
at least one second processor coupled to the second network interface and the second memory, wherein the at least one second processor is configured to execute the second set of instructions stored in the second memory to:
send, from each vault sidecar, an authorization code to the NF authorization platform, wherein the authorization code is associated with the micro-service,
forward the at least one authorization code received at the NF authorization platform to an NF registration function (NRF),
send, from the NF, a service registration request to the NRF, wherein the service registration request includes each authorization code associated with the at least one micro-service, and
register the NF with the NRF, wherein the NRF validates each authorization code received from the NF.

11. The container orchestration platform infrastructure of claim 10, wherein an authorization code is a universally unique identifier (UUID) identifying a micro-service.

12. The container orchestration platform infrastructure of claim 10, wherein the first set of instructions further cause the at least one first processor to:
encrypt the at least one authorization code by the NF authorization platform prior to forwarding the at least one authorization code to the NRF.

13. The container orchestration platform infrastructure of claim 12, wherein the first set of instructions further cause the at least one first processor to:
perform a one-way encryption algorithm on the at least one authorization code.

14. The container orchestration platform infrastructure of claim 10, wherein the second set of instructions further cause the at least one second processor to:
send an acknowledgment from the NRF to the NF authorization platform, wherein the acknowledgment confirms that the NF authorization platforms received that at least one authorization code.

15. The container orchestration platform infrastructure of claim 10, the second set of instructions further cause the at least one second processor to:
send a first command from the NF authorization platform to the NF, wherein the first command instructs the NF to suspend registration with the NRF prior to the NRF receiving each authorization code associated with the at least one micro-service.

16. The container orchestration platform infrastructure of claim 15, the second set of instructions further cause the at least one second processor to:
send a second command from the NF authorization platform to the NF, wherein the second command instructs the NF to allow registration with the NRF after the NRF receives each authorization code associated with the at least one micro-service.

17. The container orchestration platform infrastructure of claim 16, wherein the micro-services are associated with a pod within a Kubernetes infrastructure.

18. A non-transitory computer-readable medium comprising instructions, which, when executed by container orchestration platform infrastructure, cause the container orchestration platform infrastructure to:
instantiate a network function (NF) based on at least one micro-service;
inject a vault sidecar into each of the at least one micro-service, wherein the vault sidecar is transmitted from a vault service associated with an NF authorization platform to the NF;
send, from each vault sidecar, an authorization code to the NF authorization platform, wherein the authorization code is associated with the micro-service linked to the vault sidecar;
forward the at least one authorization code received at the NF authorization platform to an NF registration function (NRF);
send, from the NF, a service registration request to the NRF, wherein the service registration request includes each authorization code associated with the at least one micro-service; and
register the NF with the NRF, wherein the NRF validates each authorization code received from the NF.

19. The method of claim 1, wherein the at least one authorization code comprises conditional information pertaining to an authorization of at least one microservice.

20. The container orchestration platform infrastructure of claim 10, wherein the at least one authorization code comprises conditional information pertaining to an authorization of at least one microservice.

* * * * *